United States Patent

[11] 3,562,594

[72] Inventors Richard Sterling Jones
3922 S. 775 West, Bountiful, Utah 84010;
George Michael Stevenson, 2080 W. 5900 South, Roy, Utah 84067
[21] Appl. No. 823,886
[22] Filed May 12, 1969
[45] Patented Feb. 9, 1971
Continuation-in-part of application Ser. No. 770,915, Oct. 28, 1968, now abandoned.

[54] PULLBOX EXTENSION AND ELECTRIC METER HOUSING
7 Claims, 4 Drawing Figs.
[52] U.S. Cl. .................................................. 317/106, 174/45, 174/52; 317/107
[51] Int. Cl. .................................................. H02b 9/00, H02g 7/20

[50] Field of Search .................................................. 174/37, 38, 44, 45, 52; 317/104—107

[56] References Cited
UNITED STATES PATENTS
2,985,261 5/1961 Kubesh .......................... 174/45
3,225,224 12/1965 Rydbeck ........................ 174/52X Primary Examiner—Lewis H. Myers
Assistant Examiner—Gerald P. Tolin
Attorney—David V. Trask ABSTRACT: A pullbox extension in the form of a kilowatt hour meter housing with an open bottom adapted for mounting above a subterranean pullbox to contain a kilowatt hour meter. The top of the pullbox extension is adapted for the securement of a second kilowatt hour meter and a second meter housing.

INVENTORS.
RICHARD STERLING JONES
GEORGE MICHAEL STEVENSON
BY
David V Trask
ATTORNEY

PULLBOX EXTENSION AND ELECTRIC METER HOUSING

RELATED APPLICATIONS

This application is a continuation-in-part of U.S. application Ser. No. 770,915, filed Oct. 28, 1968. The parent application describes and claims an ornamental and protective meter box for the outdoor installation of a kilowatt hour meter above a subterranean pull box.

The present application describes and claims a similarly ornamental and protective pull box extension adapted for use as a kilowatt hour meter housing in conjunction with apparatus such as that described by the parent application. The pull box extension of this invention makes it possible to mount a plurality of kilowatt hour meters in stacked relationship above a common subterranean pull box for the receipt of secondary and return of service conductors to an underground distribution network.

BACKGROUND OF THE INVENTION

1. Field of the Invention This invention relates to underground distribution systems for electric power, notably those servicing residential areas. Specifically it provides a pull box extension for such systems.

2. Description of the Prior Art

Curbside meter pedestals are available which permit the junction of secondary and service conductors through a kilowatt hour meter at the front of a homeowner's lot. The kilowatt hour meter contained by the pedestal may be visible through a transparent portion of the pedestal base or it may be connected to a remote register visible at some other convenient location. The meter pedestal usually serves as the base for a lamp post carrying a luminaire and it may also include one or more convenience outlets for yard service.

The meter pedestals of the prior art have gained wide acceptance in residential areas consisting of single dwellings; they have gained much less acceptance in residential areas including multiple dwelling units. Each dwelling unit of a neighborhood normally requires a separate kilowatt hour meter. Outdoor meter pedestals have heretofore been adapted for housing a single kilowatt hour meter. A complete neighborhood system thus requires a separate pedestal for each dwelling unit, but it is usually unsightly to have more than one, or sometimes two, such pedestals on each lot. Accordingly, there is need for an ornamental pedestal structure capable of housing a plurality of kilowatt hour meters above a common subterranean pull box.

SUMMARY OF THE INVENTION

The present invention provides a pull box extension particularly suitable for installation atop subterranean pull boxes such as those disclosed by the aforesaid parent application Ser. No. 770,915. By "subterranean pull box" is meant a pull box of the type conventionally employed for providing access from the earth's surface to underground electrical distribution cables. The pull box extension of this invention is formed as a meter housing adapted to enclose a kilowatt hour meter installed above a subterranean pull box. The top of the pull box extension is adapted for the securement of a second kilowatt hour meter above the subterranean pull box and is further adapted for the securement of a housing for the second kilowatt hour meter. This housing may be an additional pull box extension of this invention or any of the meter housings disclosed by the parent application.

In an installation according to this invention, trenches are dug in conventional fashion to receive the necessary primary and secondary conductors. A subterranean pull box is located wherever required to permit proper access to the secondary supply conductors, and the trenches are filled with earth. One or more of the pull box extensions of this invention are mounted in stacked arrangement on top of the subterranean pull box wherever it is desired to meter service to more than one dwelling. The subterranean pull box are preferably formed as hollow, approximately cylindrical chambers of sufficient length to extend from the vicinity of a trench to the vicinity of the earth's surface and should have sufficient inside diameter to accommodate a plurality of heavy electrical cables.

Means for mounting a kilowatt hour meter and associated electrical conductors are anchored to the top of the subterranean pull box and to the top of the pull box extensions. These means may be the same as, or substantially similar to, the means described in the parent application, the disclosure of which is hereby incorporated by reference. Moreover, the pull box extension of this invention may be adapted for mounting atop a subterranean pull box in the same fashion as are the meter housings of the parent application. For example, the subterranean pull box may carry an anchoring member, usually in the form of an annular anchoring ring, preferably of circular cross section, at its top. The pull box extension of this invention may be adapted at its bottom to fit snugly around the anchoring member and may carry a similar anchoring member at its top.

Secondary conductors are brought up from below ground through a pull box and are connected above ground, through a kilowatt hour meter mounted atop the pull box, to service conductors. Both the service conductors and secondary conductors are strung from the aboveground junction connection back to the trenches for distribution to remote locations.

Sufficient portions of the secondary conductors and service conductors for making junction connections are held in position above ground by bracket means associated with the aforedescribed anchoring means mounted atop the pullbox.

As is disclosed by the parent application, in connection with the anchoring means mounted atop a subterranean pull box, the anchoring means associated with the top of the present invention may be integral with the pull box extension but is usually a separate element adapted for placement against the top surface of the extension so that it may be shimmed to level. In any event, the anchoring means is rigidly fastened atop the extension and is adapted to support a mounting bracket and associated electrical apparatus, including a kilowatt hour meter; and to function as an anchoring means for a housing for the bracket and associated apparatus. One or more extensions of this invention may be installed above a single subterranean pull box, the last such extension supporting a terminal meter housing (which may be the base of a lamp post).

According to presently preferred embodiments, the pull box extension of this invention is shaped as a hollow, approximately cylindrical chamber with its upper surface formed as a flat circular ring. The pull box extension must have sufficient height to enclose a meter and associated apparatus but is desirably as short as practicable. The preferred anchoring means is a flat ring of uniform thickness defined by concentric, short cylinders such that the outer diameter of the top of the pull box extension is larger than the outside diameter of the anchoring ring. When a meter housing is placed to fit snugly around the anchoring ring, its perimeter should not protrude beyond the perimeter of the pull box extension.

The kilowatt hour meter, anchoring ring, and associated connection means described by the aforementioned parent application, are sized and dimensioned to fit within a meter housing portion of a lamp post or other structure. The meter housing is hingedly attached to the ring for reasons of security and to fix the path traversed by the housing as it is removed from or replaced over the ring. The fit of the meter housing over the anchoring ring is preferably sufficiently snug that it is necessary to lift the housing vertically to clear the anchoring ring before it may be removed.

The pull box extension of the present invention replaces the meter housing portion of the parent application atop a subterranean pull box, and may be adapted to connect to the anchoring ring in the same fashion as are such housings. The interior shape of the pull box extension is selected to avoid either mechanical or electrical contact of an interior wall surface with the meter or any of the associated mounting means and electrical apparatus mounted above the anchoring ring. Although a variety of specific shapes for the extension's interior are permissible its cross section preferably conforms generally in shape to the cross section of the top of the pull box upon which it is mounted.

In an installation according to this invention, any meter housing, whether a terminal housing or a pull box extension, may be swung from its normally closed position (a position vertically disposed to circumscribe the anchoring ring) to its open position (a position such that the plane of the base of the housing and the plane of the anchoring ring define an angle of at least about 90°) or may be swung from its open position to its closed position without contacting any of the apparatus supported by the anchoring ring. Thus, the mounting means, kilowatt hour meter and associated electrical connection means carried thereby, and all wiring incidental thereto should fit within the space defined by the locus of curved lines beginning at each point around the perimeter of the ring, terminating above the center of the ring, and having a radius of curvature equal to the distance between said beginning point, through said center, to the point directly opposite said beginning point on the perimeter of the ring. The interior of the housing (terminal or pull box extension) is shaped and dimensioned so that as it is pivoted from open to closed position or vice versa it contacts no portion of the bracket or apparatus mounted thereon or otherwise associated therewith; however, the shape and dimensions of the interior space of the housing need not conform to the aforementioned locus-defined space, except to the extent that apparatus actually occupies said locus-defined space. In any event, the interior space of the housing desirably has horizontal cross sections at every point along its vertical axes approximately identical in shape to the corresponding cross section of the anchoring ring. The vertical cross sections of the interior of the housing need only have sufficient height to accommodate the enclosed apparatus.

DESCRIPTION OF THE DRAWINGS

In the drawings, which illustrate what is presently regarded as the best mode for carrying out the invention.

DESCRIPTION OF THE ILLUSTRATED EMBODIMENT

Figure 1:
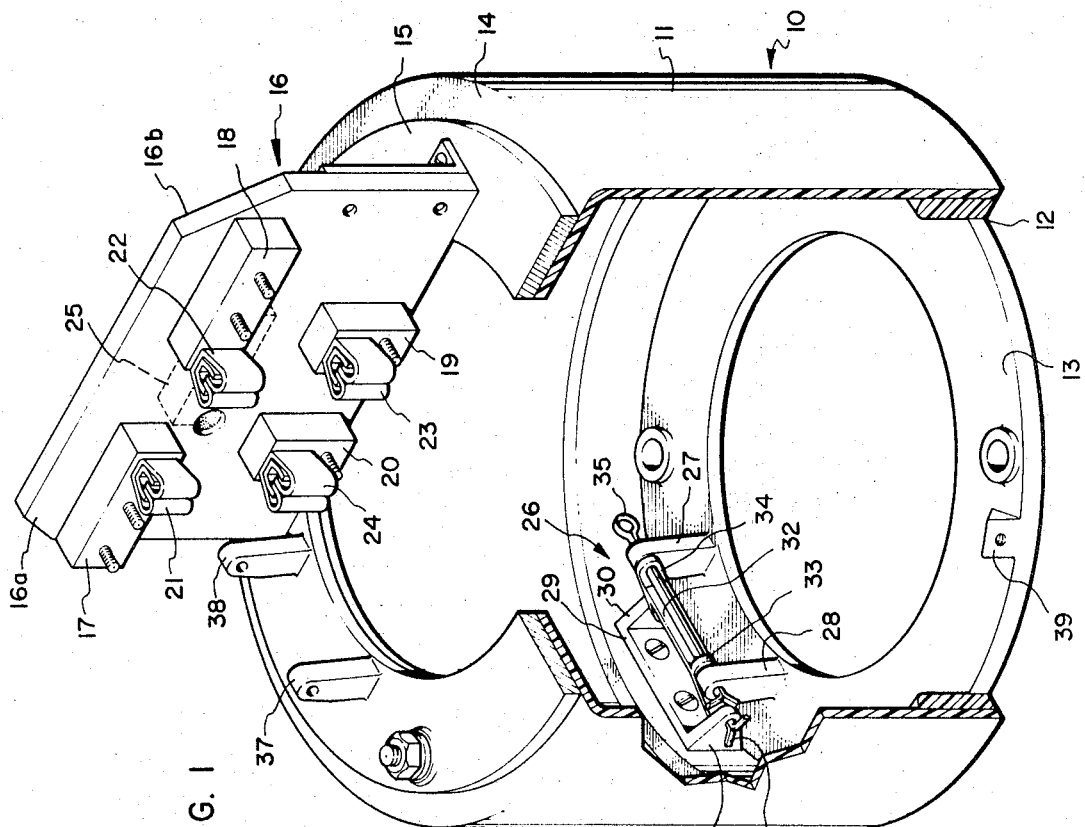
FIG. 1 is a perspective view of one form of the invention, partially broken away to expose its mode of installation, carrying structure normally associated with its use.

The pull box extension 10 of this invention, as illustrated by FIG. 1, comprises a hollow, cylindrical chamber 11, adapted as a meter housing with an open bottom 12 adapted to fit snugly around an anchoring ring 13 of the type described in the aforementioned parent application Ser. No. 770,915. The top 14 of the pull box extension is formed as a flat ring extending inward from attachment to the upper peripheral edge of the cylindrical chamber 11. A second anchoring ring 15 is bolted to the top 14 of the pull box extension and a mounting bracket 16 is secured to the top of this anchoring ring 15. The mounting bracket 16 carries suitable bus bars 17, 18, 19 and 20 on one surface 16a for making junction connections of hot conductors. Each of these bus bars 17 through 20 carries a clip 21 through 24, respectively, for the plug-in-connection of a kilowatt hour meter (not shown). The other surface 16b of the bracket carries a bus bar 25 for the junction connection of neutral conductors. The anchoring rings 13 and 15 may be substantially identical, as illustrated, and the ring 13 will ordinarily support a mounting bracket (not shown) and associated bus bars substantially identical to those illustrated on the ring 15 (see FIG. 4).

The bottom of the meter housing portion 11 is connected to the anchoring ring 13 by means of a double-pivoting hinge 26; including spaced lugs 27 and 28 extending vertically from the ring 13, a member 29 attached to the housing wall 11 with spaced lugs 30 and 31 extending horizontally as shown, and a connecting member 32 with spaced arms 33 and 34 pivotally joining the vertical lugs to the corresponding horizontal lugs by means of cotter keys 35 and 36. The ring 15 includes spaced vertical lugs 37 and 38 (corresponding to the lugs 27 and 28 of ring 13) for the anchoring of a meter housing to enclose the bracket 16 and any associated electrical apparatus. Each ring includes means, such as the tapped lug 39 illustrated, for locking the meter housings in place (see FIG. 4).

Figure 2:
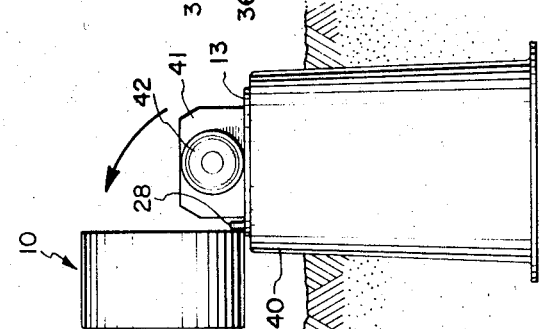
FIG. 2, a view in elevation, showing the invention installed atop a subterranean pull box as the pedestal for an outdoor lamp post (shown compressed) in open condition.
Figure 3:
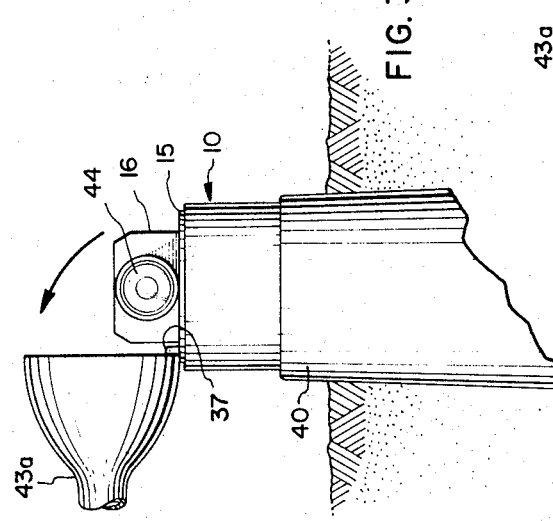
FIG. 3, a similar view with the invention in closed condition and the lamp post in open condition.
Figure 4:
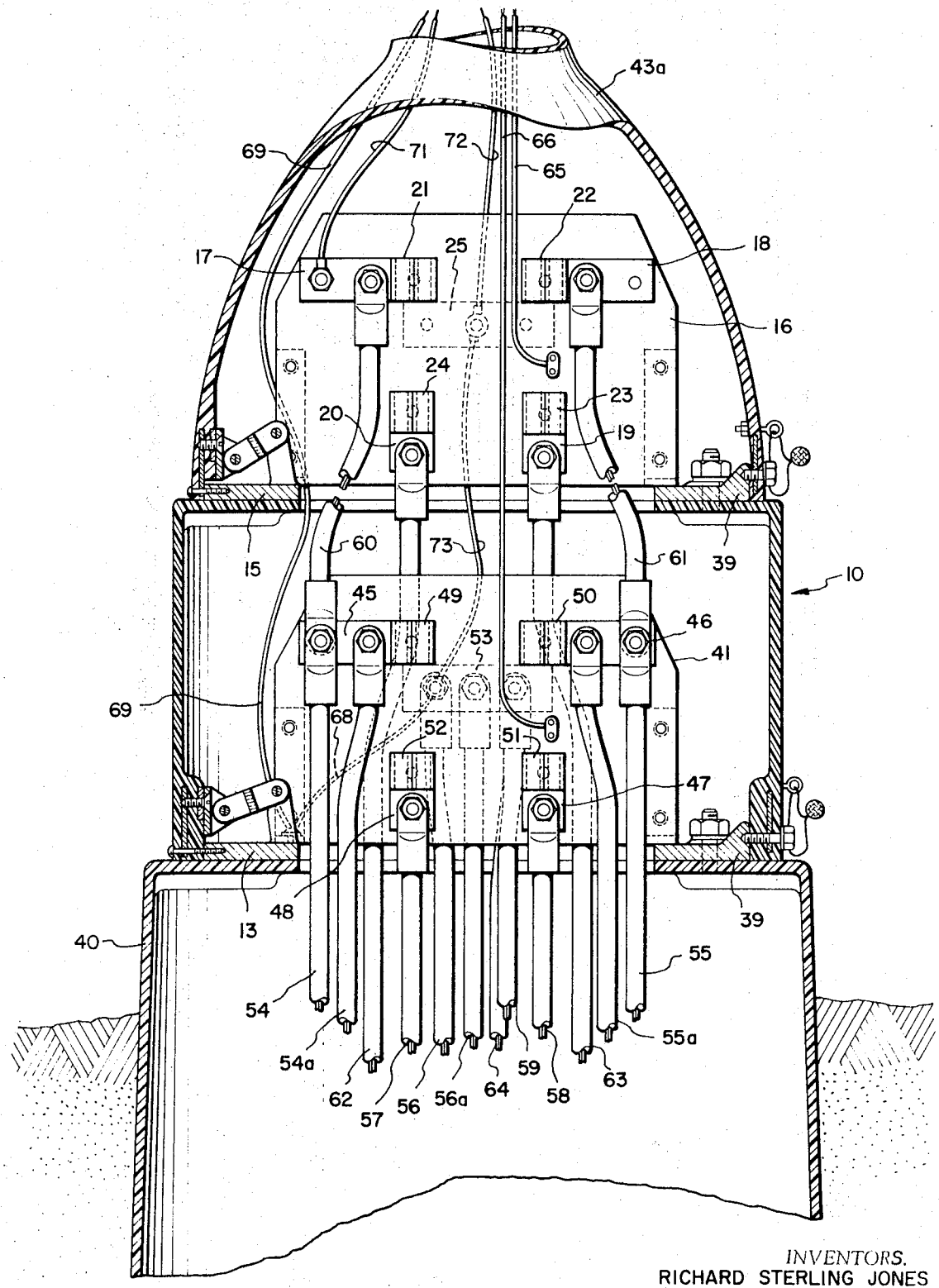
FIG. 4, a similar view in section, on an enlarged scale, with both the invention and lamp post in closed condition.

FIGS. 2, 3, and 4 show a typical installation of this invention above a subterranean pull box 40. The pull box extension of this invention is pivotally connected at its bottom to a first anchoring ring 13 atop the pull box 40 so that it may be pivotally opened as illustrated by FIG. 2 and closed as illustrated by FIGS. 3 and 4 with respect to the mounting bracket 41 and associated apparatus, including a kilowatt hour meter 42, mounted above the ring 13. The base 43a of an outdoor lamp post 43 is pivotally connected to a second anchoring ring 15 so that it may be opened as illustrated by FIG. 3 or closed as illustrated by FIGS. 2 and 4 with respect to a second mounting bracket 16 and associated apparatus, including a kilowatt hour meter 44, mounted above the ring 15.

FIGS. 2 and 3 illustrate a convenient arrangement of the brackets 16 and 41 and the meters 42 and 44 supported thereby. For clarity, other components such as wiring and bus bars are omitted. FIG. 4 illustrates the internal wiring of the mounting brackets 16 and 41 with the meters removed. Additional pull box extensions may be mounted in stacked arrangement between the single unit 10 shown the terminal meter housing; in the illustrated instance, lamp post base 43a.

Referring specifically to FIG. 4, the bus bars and meter clips 17 through 25 associated with the mounting bracket 16 atop the upper anchoring ring 15 are as described hereinbefore. The mounting bracket 41 atop the lower anchoring ring 13 carries corresponding hot bus bars 45, 46, 47, and 48, meter clips 49, 50, 51, and 52, and neutral bus bar 53. Most of the junction and splice connections required can be made on the bus bars carried by the bracket 41 directly above the subterranean pull box. The upper bracket 16 is preferably used only for electrical connection of the meter 44 (FIG. 3) and any wiring required for lights, outlets or other fixtures conveniently located with respect to the bracket 16.

Secondary hot cables 54 and 55 are splice-connected to bus bars 45 and 46, respectively, as shown, such that continuing segments 54a and 55a of these cables are returned to below ground. A neutral cable 56 is splice-connected to the neutral bus bar 53 and is similarly returned 56a to below ground. Conventional three-wire service is provided to a first dwelling unit by hot service conductors 57 and 58 and neutral conductor 59 which are strung to the dwelling unit below ground. This service is metered by a first kilowatt hour meter (not shown, see 42, FIG. 2) plugged into meter clips 49 through 52.

The secondary hot cables 54 and 55 are also connected to the bus bars 17 and 18 by conductors 60 and 61, respectively, as shown. The conductors 60 and 61 are sufficiently long to permit opening of the lamp post base 43a as shown in FIG. 3. Service to a second dwelling unit is metered through a second kilowatt hour meter (not shown, see 44, FIG. 3) plugged into clips 21 through 24 and is delivered via hot service conductors 62 and 63 and neutral conductor 64. The neutral conductor 64 is conveniently strung from the neutral bus bar 53 associated with the lower mounting bracket 41.

Conventional cord sets 65 and 66 may be provided to connect the kilowatt hour meters (not shown) of each service assembly to a remote register (67, FIG. 2.) By "service assembly" is meant an anchoring ring and the associated mounting bracket, bus bars, and kilowatt hour meter, such as those illustrated, or equivalent apparatus.

The pull box, pull box extension, and terminal meter housing may be constructed of fiber glass-reinforced resins or other insulating material. In that event, it is desirable to provide mechanical grounding to connect all remote, potentially "hot" regions with ground. In the illustrated instance, neutral bus bar 53 is connected by conductor 68 to the anchoring ring 13. Conductor 69 connects the anchoring ring 13 to any remote fixture, such as metallic luminaire (70, FIG. 2) at the top of lamp post 43. Hot and neutral conductors 71 and 72, which supply power to such a fixture, may be connected to any convenient appropriate hot or neutral bus bars. In the illustrated instance, the conductors are most conveniently strung from bus bars associated with the upper mounting bracket. Bus bar 25 is connected to bus bar 53 by a conductor 73. The hot conductor 71 is connected to a secondary bus bar 17, as shown when it is inappropriate to charge the cost of this service to a particular dwelling unit.

Reference herein to details of the illustrated embodiment is not intended to limit the scope of the claims which themselves recite those features regarded as essential to the invention.

We claim:

1. In an electrical distribution system comprising a subterranean pull box for access from the surface of the earth to the underground of electrical cables; and a kilowatt hour meter mounted above the pull box, the improvement which comprises a pull box extension mounted directly atop said subterranean pull box to enclose a first kilowatt hour meter and carrying a second kilowatt hour meter on its top approximately directly above said first kilowatt hour meter such that secondary and service conductors may be junction-connected through each said kilowatt hour meter from the pull box.

2. The improvement of claim 1, wherein said pull box extension is a hollow, approximately cylindrical chamber with its upper surface formed as a flat, inwardly extending ring, the hollow interior of said chamber having sufficient height to accommodate said first kilowatt hour meter.

3. The improvement of claim 2 wherein said subterranean pull box has an approximately circular cross section and the pull box extension is dimensioned such that when it is mounted atop said pull box its perimeter does not protrude beyond the perimeter of said subterranean pull box 4. A pull box extension comprising:
   a housing for a kilowatt hour meter with an open bottom and an open top for the passage of electric conductors therethrough;
   an anchoring member removably mounted within the bottom of said housing for securement of said housing atop a subterranean pull box of the type used to provide access from the surface of the earth to underground electric conductors, said anchoring member including means for mounting a kilowatt hour meter within said housing when said housing is secured atop a subterranean pull box and being shaped and dimensioned to fit snugly within the bottom of said housing so that when the housing is placed over said anchoring member for securement above a said subterranean pull box, it must be lifted vertically to clear the anchoring member to disengage said housing from said anchoring member; and
   bracket means atop said housing for the securement of a kilowatt hour meter atop said housing.

5. A pull box extension according to claim 4 wherein the housing is connected to said anchoring member by means of a hinge comprising a first member affixed to the inside of the housing near its bottom, a second member affixed to the anchoring member, and a connecting link pivotably connected to each said member, said members being spaced sufficiently to permit the vertical movement required for the housing to disengage the anchoring member.

6. A pull box extension according to claim 4 wherein the bracket means atop said housing is supported from an anchoring member substantially identical to said first-named anchoring member.

7. A pull box extension according to claim 4 including a subterranean pull box wherein said anchoring member for securing said housing atop said pull box is attached atop said pull box.

PO-1050
(5/69)

UNITED STATES PATENT OFFICE
CERTIFICATE OF CORRECTION

Patent No. 3,562,594            Dated February 9, 1971

Inventor(s) Richard Sterling Jones and George Michael Stevenson

It is certified that error appears in the above-identified patent and that said Letters Patent are hereby corrected as shown below:

Claim 1, line 2, delete "the" (third occurrence); line 3, delete "of."

Signed and sealed this 8th day of June 1971.

(SEAL)
Attest:

EDWARD M. FLETCHER, JR.          WILLIAM E. SCHUYLER,
Attesting Officer                  Commissioner of Pater